United States Patent [19]

Bechly et al.

[11] 3,893,168

[45] July 1, 1975

[54] TECHNIQUE FOR MINIMIZING INTERFERENCE IN VIDEO RECORDER REPRODUCER SYSTEMS

[75] Inventors: Fred Lorin Bechly, Cherry Hill; Jing Jue Young, Delran, both of N.J.

[73] Assignee: RCA Corporation, New York, N.Y.

[22] Filed: Mar. 7, 1974

[21] Appl. No.: 448,922

[52] U.S. Cl. ........ 360/25; 360/30;33; 178/DIG. 12; 358/8

[51] Int. Cl. ........................................ G11b 5/02

[58] Field of Search .................. 360/25, 29, 30, 33; 178/DIG. 12; 358/8; 325/475

[56] References Cited

UNITED STATES PATENTS 3,571,526 3/1971 Stockwell.............................. 360/24

*Primary Examiner*—James W. Moffitt
*Attorney, Agent, or Firm*—Eugene M. Whitacre

[57] ABSTRACT

A technique is disclosed for reducing moire type interference in a signal which is recorded and recovered from a magnetic record medium. An interference component, which is of opposite sense to that predictably occurring during the record-playback process, is generated and added to the recorded information signal. Resultant coaction of the purposely generated interference component and that produced during transducing of the information signal results in an interference cancellation providing an improved output signal from the system.

8 Claims, 4 Drawing Figures

TECHNIQUE FOR MINIMIZING INTERFERENCE IN VIDEO RECORDER REPRODUCER SYSTEMS

Figure 1B:
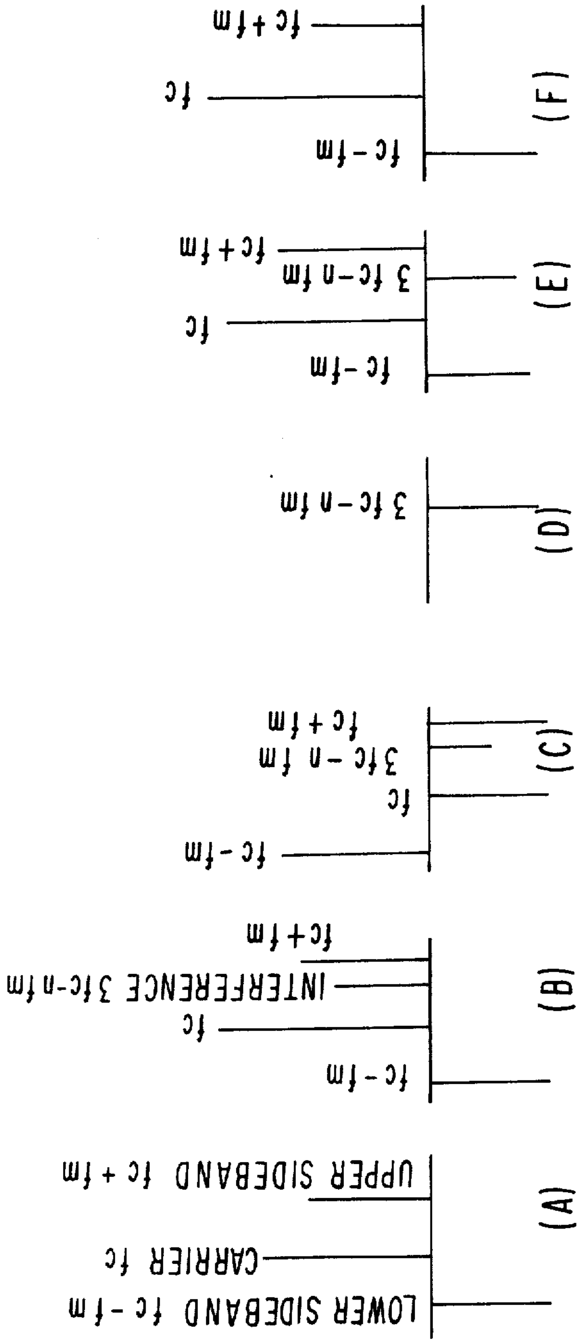

The invention relates to a signal processing technique useful in video recorder/reproducer systems, wherein the video information is transduced with a magnetic record medium. It is particularly applicable, although not limited to, systems utilizing angle modulation techniques such as frequency or phase modulation for recording on the magnetic medium.

In a video tape recorder, the signal recorded on tape is often frequency modulated (FM) with the video signal. The modulating composite color video signal includes a luminance signal and a chrominance signal which is modulated on a subcarrier of frequency 3.58 MHz in domestic standard, or 4.43 MHz in European standard. Usually the FM carrier frequencies utilized are close to that of the color subcarrier. Typically, an FM signal has both upper and lower sidebands equally spaced with a frequency difference equal to the modulating frequency, and with amplitudes in terms of Bessel functions. If such a signal suffers distortion which generates higher order harmonics of FM carrier frequency, because the carrier is frequency modulated, the higher order harmonics are also frequency modulated with a modulation index proportional to the order of the harmonics involved. The lower sidebands of these higher order harmonics, especially the second and third harmonics which fall into the vicinity of the FM carrier within the video bandwidth can produce spurious outputs which are often referred to as moire. Even order harmonics of the FM carrier are generated by nonsymmetric non-linearities in signal processing and might be minimized by careful design in avoiding this type of nonlinearity.

In recording of video information on a magnetic record medium, limiting of the signal can inherently occur as a result of the saturation characteristics of the magnetic record medium, such as magnetic tape. This is particularly true where FM techniques are utilized for recording the video signal on the tape. In addition, limiting of the signal in the playback processing circuitry which recovers the signal from the magnetic record medium is a usual and necessary procedure in such FM systems.

It is believed that tape saturation or limiting phenomenon are substantially symmetrical and therefore introduce principally odd order harmonics. The limiting phenomenon produces in particular strong third harmonic signal components of the carrier frequency. The lower FM sidebands of the carrier third harmonic fall in the FM band utilized for recording the signal and are demodulated. This causes interference with the color subcarrier and results in a moire or interference pattern in the display of the recovered video information. Thus, it is desired in accordance with the disclosed arrangement to minimize or eliminate such interference.

Although the disclosed arrangement is discussed mainly in connection with the moire due to third harmonic distortion, the principles are applicable to other odd harmonic components as well. In addition, it will be understood that the disclosed scheme is primarily directed to and effective in cancellation of limiting effects due to saturation of the record medium upon recording. However, it is contemplated that some amount of beneficial moire improvement in the ultimate output of a recorder/reproducer may be effectuated with respect to limiting associated with playback signal processing.

Normally the amplitude of the moire is kept to an acceptable level, for example, by using a small FM deviation and using carrier frequencies as high as possible. However, there are proposals for operation of magnetic recorder/reproducer systems in which the tape record medium speed is reduced and medium usage altered by narrowing the video information tracks. While offering certain advantages, this could result in appreciable loss in signal-to-noise ratio performance of the system. To partially compensate for such loss, the FM deviation may be increased, but this can result in more interference. Interference could be reduced by increasing the carrier frequency; however, it is felt that the residual interference level may not be acceptable.

As indicated, the interference components are generated in limiting the FM signal, which may occur in two ways. First, there is the limiting phenomenon due to saturation of the magnetic recording medium during recording, which is a dominant factor and is unavoidable. Further, there is usually circuit limiting of the FM signal in playback to remove amplitude modulation.

An article entitled, "Spectrum Analysis of Magnetic Video Recorder FM Systems," by Sadashige and Van Anda, appearing at pages 34–38 of RCA ENGINEER, Vol. 13, No. 5, February-March 1968, the disclosure of which is hereby incorporated by reference, provides an expanded discussion of the spectrum energy distribution characteristics of a magnetic video recorder FM system; analyzes the spurious frequencies generated in the recording and signal recovery process; and discusses factors that affect the signal-to-noise ratio of the played back video signal.

Elimination or minimizing of the moire interference due to the limiting phenomenon by signal processing during playback is desirable, but has been found difficult to accomplish. In accordance with the invention, it has been found advantageous to eliminate or at least minimize the moire interference in a simplified manner by the disclosed signal processing technique which is accomplished prior to recording the FM video signal on the magnetic record medium. Basically, there is purposely generated an interference component which is opposite in sense or polarity to that which will predictably result by limiting in the process of recording and recovering the video signal. The resultant coaction of the purposely generated interference component and that produced during transducing of the video signal information results in a cancellation effect so as to provide an improved pictorial display of the recovered information.

Briefly, in accordance with the invention, there is provided an angle modulated signal including a carrier component and sideband components produced in accordance with a modulating signal. Limiting means responsive to the angle modulated signal provide an output with a further component whose frequency is related to the frequency of the carrier component and the input modulating signal. Inverting means are coupled to the output of the limiting means. Signal combining means is responsive to the output of the inverting means and the angle modulated signal to provide a further output signal. And there are means coupled to the further output for recording the further signal on a magnetic storage medium.

Figure 1A:
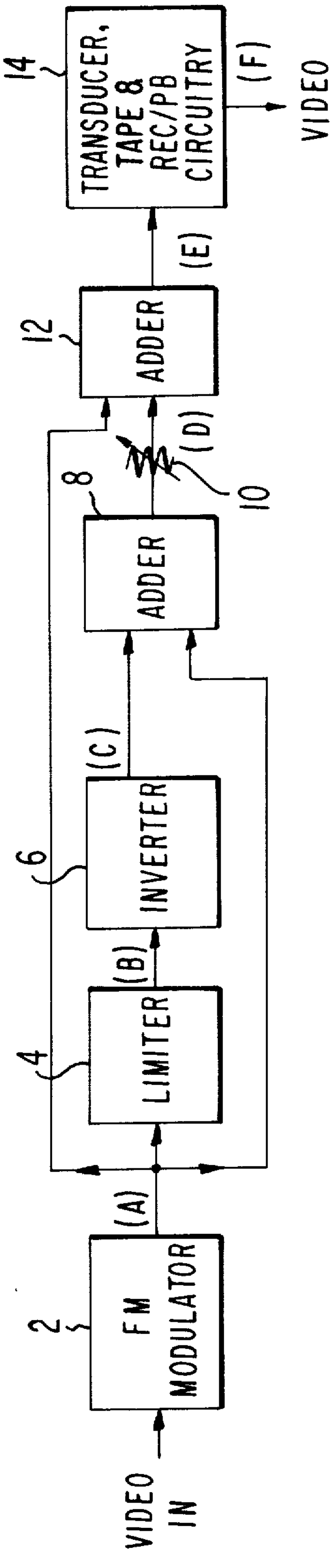
Figure 2A:
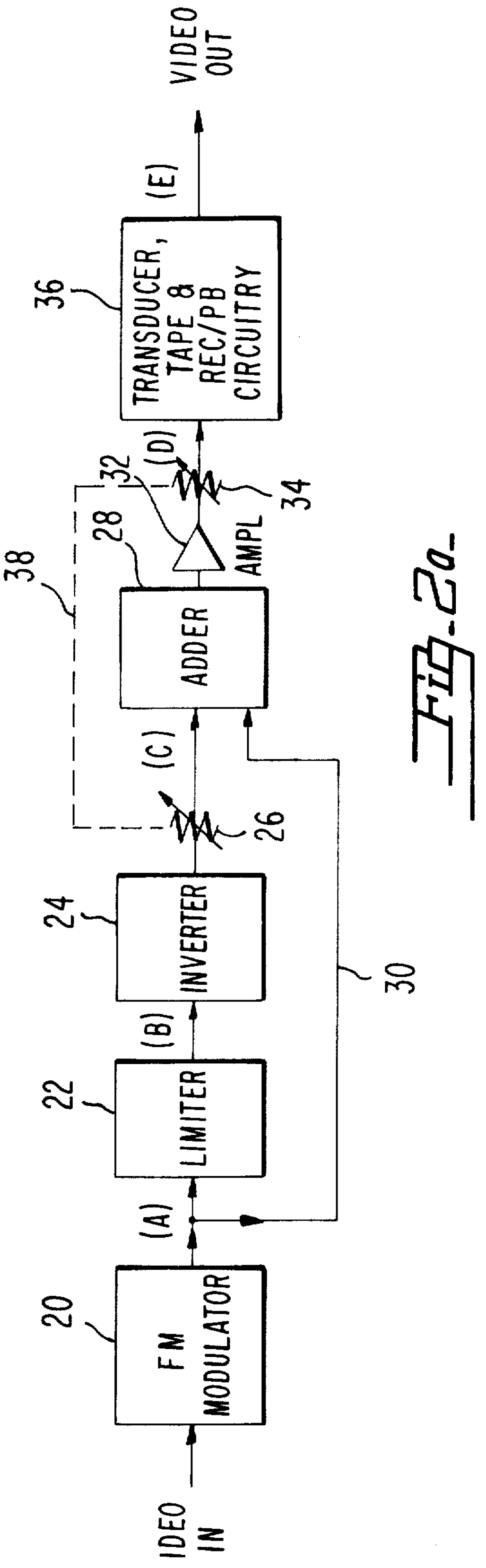
Figure 2B:
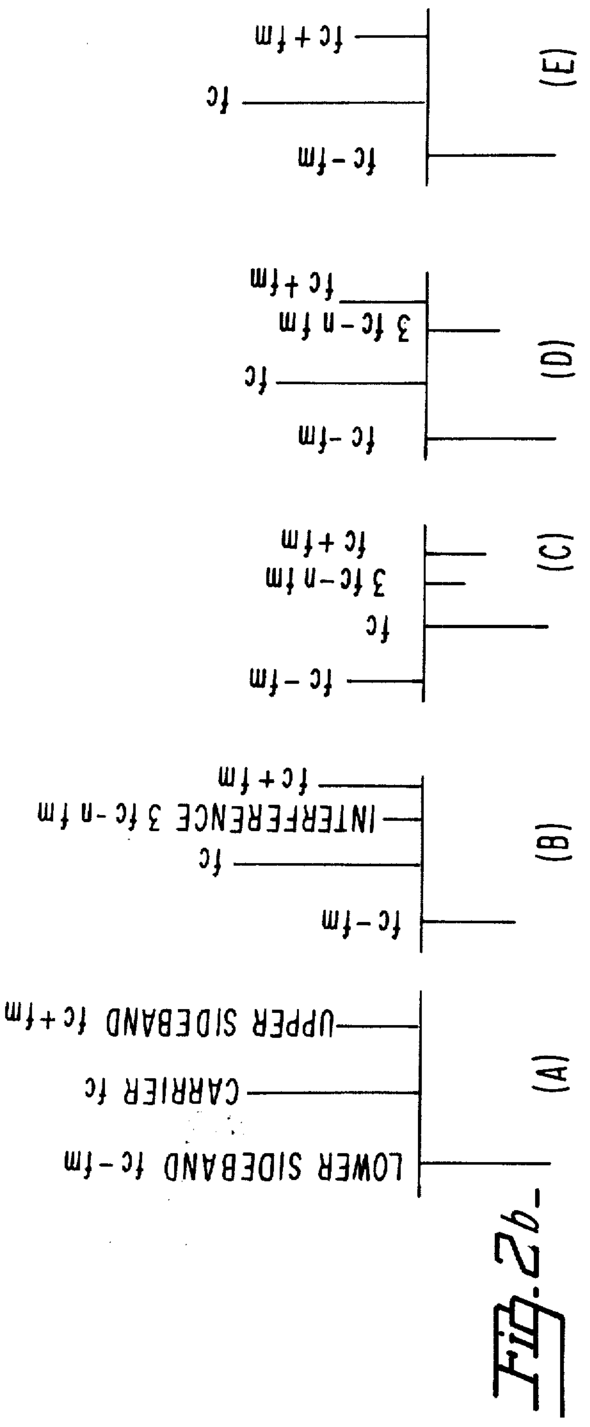

The invention will be understood from the following detailed discussion when taken in conjunction with the drawing, in which:

FIG. 1*a* is a diagram in block form of an embodiment of a signal processing arrangement in accordance with the invention;

FIG. 1*b* is a series of frequency component diagrams correlated to various signal portions of the arrangement of FIG. 1*a*;

FIG. 2*a* is a diagram primarily in block form of a further embodiment of a signal processing arrangement in accordance with the invention; and FIG. 2*b* is a series of frequency component diagrams correlated to various signal portions of the arrangement of FIG. 2*a*.

In the arrangement of FIG. 1*a* a video input signal which includes a composite of luminance, chrominance and synchronizing information is applied to an FM modulator. The FM modulator may be of the type usually found in such video recording systems and may, for example, comprise a heterodyne or flip-flop type of FM modulator. The output of the modulator 2 is a carrier frequency modulated in accordance with the composite color video input. It will be understood that the output of the modulator 2 includes a plurality of sidebands of the carrier frequency which are produced by the luminance and chrominance subcarrier components of the modulating video signal. However, for purposes of explanation here, only the first upper and lower sidebands of the carrier modulated by the color subcarrier are shown throughout the drawing.

The output of the FM modulator 2 is fed to a limiter means 4. The limiter means may be of the type typically used in the playback signal processing circuitry in FM video recorder/reproducer systems. As previously indicated, any such limiting device for FM will inherently produce a strong third harmonic component of the carrier frequency as well as sidebands of the third harmonic component. One or more of the lower sideband components of the third harmonic of the carrier which may be represented generally by the expression $3f_c-nf_m$, where $n$ is an integer, will be located within the vicinity of deviation of the carrier frequency by the video input signal. Thus, the output B of the limiter 4 shown in FIG. 1*b* includes an interference component which is related in frequency to the carrier frequency and the modulating input video signal. The output of the limiter 4 is applied through a well-known inverter circuit 6 to one input of a first adder means 8. A second input to the adder means 8 is provided from the output of the FM modulator 2. The combining action of the adder on the components A and C of FIG. 1*b* results in an output from adder A as shown in D of FIG. 1*b*. It will be noted that the output of the adder 8 comprises the interference component $3f_c-nf_m$ alone, the other frequency components having been substantially cancelled by action of the adder 8. It will be understood that suitable active and/or passive means, if required, may be utilized prior to or within the adder 8 for assuring cancellation to produce the output D from the adder. The output of adder 8 is applied through a magnitude or amplitude adjusting means 10 to one input of a further adder means 12. The amplitude adjusting means 10 may, for example, comprise a well-known variable resistance passive network. A further input to the adder means 12 is provided from the output of modulator 2. The combining action of the adder means 12 produces at its output a signal including components as shown by E in FIG. 1*b*. The output of adder 12 is then caused to be recorded in usual manner on a magnetic record medium such as a magnetic tape. The means for accomplishing the recording and playback are well-known and therefore shown in summary fashion by the block 14. It will be understood that since the purposely generated interference component of signal E is arranged to be opposite in sense to that which may predictably result from the limiting phenomenon associated with the record/playback system, a cancellation of the moire producing interference is accomplished in the process of the record/playback of the signal. Thus, undesirable interference of the FM spectrum of the playback video signal shown at F of FIG. 1*b* is substantially reduced. The amplitude adjusting means 10 is utilized to provide the proper amount of deliberately generated interference component which will be effective in cancelling a like interference resulting from the record/playback process which produces video output.

In a further embodiment of FIG. 2*a*, the composite video input signal is again applied to an FM modulator device 20, which may be of the type discussed with respect to the arrangement of FIG. 1*a*. The output signal of the modulator 20, which is comprised of frequency components such as depicted in A of FIG. 2*b* is again applied to a limiter means 22. The limiter means 22 produces a signal with frequency components as depicted in B of FIG. 2*b*. As previously discussed, the output of the limiter means produces an interference signal comprising the third harmonic of the carrier frequency along with sidebands of such third harmonic. This interference signal represented generally by the expression $3f_c-nf_m$ in B of FIG. 2*b* has a component whose frequency falls within the domain of interest with respect to FM recording of the video signal on a magnetic medium. The output of the limiter means is inverted in an inverter means 24. The output of the inverter means 24 is applied through an amplitude control device 26 as one input to an adder means 28. Again, the amplitude adjusting means 26 may, for example, comprise an active device or a well-known variable resistance passive network.

A further input to the adder means 28 is provided on lead 30 from the output of the FM modulator 20. The adder means 28 adds the output of inverter 24 with the original FM signal from the modulator 20 to produce an output which is passed through an amplifying means 32 and a further amplitude adjusting means 34 to give an FM signal with a negative interference component as depicted in D of FIG. 2*b*. This FM signal is then caused to be recorded in usual manner on a magnetic record medium such as a magnetic tape. The components for accomplishing this are well-known and therefore diagrammatically represented by the block 36.

As shown in FIG. 2*a*, the amplitude adjusting means 26 and 34 are arranged for simultaneous adjustment. This may be accomplished by any suitable known means such as a mechanical link represented here by the dashed line 38. The ganged controls 26 and 34 are utilized in conjunction with the amplifying means 32 to provide a desired amount of negative interference while maintaining a desired level of the balance of the FM signal which is recorded on the magnetic record medium. Again, the purposely generated interference component from the limiter means 22 which is applied to the magnetic record medium is arranged to be opposite in sense or polarity to that which predictably results from the recording and playback process. More particularly, the level of the interference component D of FIG. 2*b* as applied to the magnetic medium is adjusted to produce an interference cancellation effect, thus producing an FM spectrum of the video signal shown as E of FIG. 2*b*, in which interference is substantially reduced.

It will be understood throughout the prior discussion that it is contemplated that, if required, suitable delay means may be utilized in appropriate signal branches of the described embodiments for accomplishing appropriate combination of signal components in the adder means to produce the various signals as indicated in FIGS. 1*a* and 1*b*. The delay means referred to would be utilized to equalize delays which might occur in the circuitry utilized in the discussed embodiments.

What is claimed is:

1. A system for minimal distortion transducing of an angle modulated signal with a magnetic record medium, said signal including a carrier component and sideband components, produced in accordance with a modulating signal, comprising: limiter means responsive to said angle modulated signal for providing an output with a further component whose frequency is related to the frequency of said carrier component and said modulating signal, inverting means coupled to the output of said limiting means, signal combining means responsive to the output of said inverting means and said angle modulated signal to provide a further output signal, and means coupled to said further output for recording said further signal on said magnetic record medium.

2. The invention according to claim 1, wherein the output of said limiter means includes a frequency component which is a sideband of an odd harmonic of said carrier frequency component.

3. The invention according to claim 1, wherein the frequency of said further component $f_l$ output of said limiter means is related to said carrier frequency $f_c$ and said modulating signal $f_m$ by the expression, $f_l = 3f_c - nf_m$, where $n$ is an integer.

4. The invention according to claim 1, including signal amplitude adjusting means operative in conjunction with said signal combining means to determine the magnitude of the components of said further output signal as applied to said magnetic medium.

5. The invention according to claim 1, wherein said signal combining means includes first means for adding said angle modulated signal with the output of said inverting means, and further means for adding said angle modulated signal with the output of said first adding means.

6. The invention according to claim 5, including means coupled to the output of said first adding means for altering the amplitude thereof as applied to said second adding means.

7. The invention according to claim 1, wherein said signal combining means includes means for adding said angle modulated signal with a further input thereto, first signal amplitude adjusting means for applying the output of said inverting means to said adding means, and further signal adjusting means for altering the amplitude of the output of said adding means.

8. The invention according to claim 7, wherein said first and further signal adjusting means are variable and including means for simultaneously varying the amplitude adjustment provided by said signal adjusting means.

* * * * *